United States Patent
Castellani

[15] 3,683,714
[45] Aug. 15, 1972

[54] EAR TRANSMISSIONS

[72] Inventor: Giovanni Castellani, Via Orlandi 9, Modena, Italy

[22] Filed: Nov. 16, 1970

[21] Appl. No.: 89,592

[30] Foreign Application Priority Data

Dec. 1, 1969 Italy...................31166 A/69

[52] U.S. Cl. .................................74/414, 74/434
[51] Int. Cl. ..........F16h 1/06, F16h 1/16, F16h 55/04
[58] Field of Search..74/434, 414, 424.5, 412, 421 R

[56] References Cited

UNITED STATES PATENTS

| | | | |
|---|---|---|---|
| 2,509,660 | 5/1950 | Wingren | 74/414 |
| 2,952,165 | 9/1960 | Bade | 74/421.4 R X |
| 1,506,554 | 8/1924 | Basso | 74/414 |
| 1,753,825 | 4/1930 | Ford | 74/414 |
| 3,554,613 | 1/1971 | Fiscus et al. | 74/424.5 |

OTHER PUBLICATIONS

"Gears" by Merritt, 718M190 – Pitman, 3rd. Ed., 1954, Pitman & Sons, Ltd., London–Pages 334–336, incl.

Primary Examiner—Leonard H. Gerin
Attorney—Steinberg & Blake

[57] ABSTRACT

A gear transmission for transmitting a drive between a pinion and a component driving the same or driven thereby. This latter component is of dimensions substantially larger than that of the pinion, and the pinion and its driven component have parallel axes. The teeth of the pinion have a width parallel to its axis substantially less than the width of the teeth of the other component parallel to the axis of the latter. The pinion is preferably made of steel and case-hardned, while the other component is provided with surface-hardened teeth, such as induction or flame-hardened teeth.

7 Claims, 2 Drawing Figures

EAR TRANSMISSIONS

BACKGROUND OF THE INVENTION

The present invention relates to gear transmissions.

More particularly, the present invention relates to a transmission between a pinion and a rotary gear component, although the invention is equally applicable to all types of gear transmission such as a pinion and rack, or a pinion and an internal or external ring gear, etc. The pinion and other component may take the form of spur gears or helical or other types of gears.

As is well known, gear transmissions of the above type can have at the components thereof surfaced-hardened teeth with equalized load capacities. Thus, with the invention, the gear transmission has for its component equalized load capacities.

It is known to construct pinions with teeth having a width, parallel to the pinion axis, considerably greater than that of a gear wheel driven by the pinion. With such known components, there is no particular coordination with surface hardness, in order to achieve an equalized distribution of the resistance and load capacity of the teeth.

Current practice is based on a number of well known considerations and conclusions. Among these are the fact that surface hardening of gear teeth enables cheaper spur and helical gears to be produced, while case hardening is the most effective way of increasing reliability and load capacity with no rise in cost, whereas nitriding, even though effective and suitable in certain individual cases, is extremely expensive. On the other hand, heat hardening such as induction or flame surface hardening, while as effective as case hardening in certain cases, is generally less reliable mainly because of irregularities of hardness that may occur at the roots of the teeth, and it is precisely at this location that breakage and wear are most to be feared, the factor of wear limiting the load capacity and causing particles of the transmission components to become detached with subsequent pitting. For gear wheels of relatively large dimensions, case hardening is inadvisable because of gross deformation which is encountered. Such deformation can only be eliminated by grinding operations which undesirably increase the production costs to such an extent that such costs are to be avoided except in special cases. Surface hardening, on the other hand, in the form of induction or flame hardening, causes negligible deformation for such gear components of large dimensions. Breakage and pitting are most likely to be encountered at the roots of a pinion, so that the pinion is often made of a greater width or thickness than a gear wheel driven by the pinion. In other words, the length of each pinion tooth parallel to the pinion axis is greater than the length of each gear wheel tooth parallel to the axis of the latter. Form factors which indicate strength, may be equalized for a pair of meshing gears of the above type by means of suitable modifications to the addendum and thickness whereas profile durability, even if it may be increased overall by means of addendum and thickness modifications, is less in the dedendum of both the pinion and the wheel, precisely where pitting usually occurs. Therefore, in the case of heat-treated, as distinguished from surface-hardened, gears, the pinion is sometimes made harder than the gear wheels since the dedendum of the pinion is more vulnerable. Induction or flame-hardened teeth have critical zones at the side extremities, which is to say at the region of the opposed or front and back surfaces of the gear, because of the particular manner in which the heat is diffused, and therefore, in order to avoid cracks, which are a troublesome source of breakage, a lesser degree of hardness must be accepted. Moreover, such zones play no role in contributing toward the load capacity and show signs of local pitting, which is a source not only of damage to the mechanism through pollution of the lubricant but also of splintering and eventual cracking and breakage of the transmission component.

SUMMARY OF THE INVENTION

In view of the above drawbacks inherent in the present practice, it is an object of the present invention to provide a gear transmission of the above general type which while retaining radial dimensions for the transmission, nevertheless at the same time enables achievement of a reduction in weight as well as a reduction in overall size and cost.

In addition, it is an object of the invention to provide a construction which can retain these latter advantages while increasing the load capacity for spur and helical gears of every type including not only spur or helical gears, but also external or internal gears or racks. These latter factors are of particular advantage when encountering heavy work-loads; and large dimensions or when encountering small or medium dimensions where the diameter of the wheel considerably increases that of the pinion.

It is a further object of the invention to provide a coordination between the thermal treatment of the pinion and of the wheel in a manner contrary to current practice for achieving a great improvement in the transmission.

Thus, in accordance with the invention the pinion will have a width for its teeth in a direction parallel to the pinion axis, substantially less than that of the gear wheel or other driven component, this difference being on the order of 3-10 mm or more, in accordance with the particular dimensions of the teeth. In this way it is possible with the invention to achieve a complete solution to the technical problems referred to above.

Thus, in accordance with the invention a pinion is provided which meshes with a gear component such as a gear wheel, and the pinion has an axis parallel to the axis of the other gear component. The teeth of the pinion in a direction parallel to the axis thereof have a dimension substantially less than the corresponding dimension of the teeth of the gear component. The pinion is case-hardened while the teeth of the larger gear component are surface-hardened by a heat hardening in the form of induction or flame-hardening. The pinion is centered so that the opposed side surfaces of the gear component project through uniform distances respectively beyond the opposed side surfaces of the pinion, and in this way it is possible to achieve a great improvement in transmission of the above general type.

BRIEF DESCRIPTION OF DRAWINGS

The invention is illustrated by way of example in the accompanying drawings which form part of this application and in which.

Figure 1:
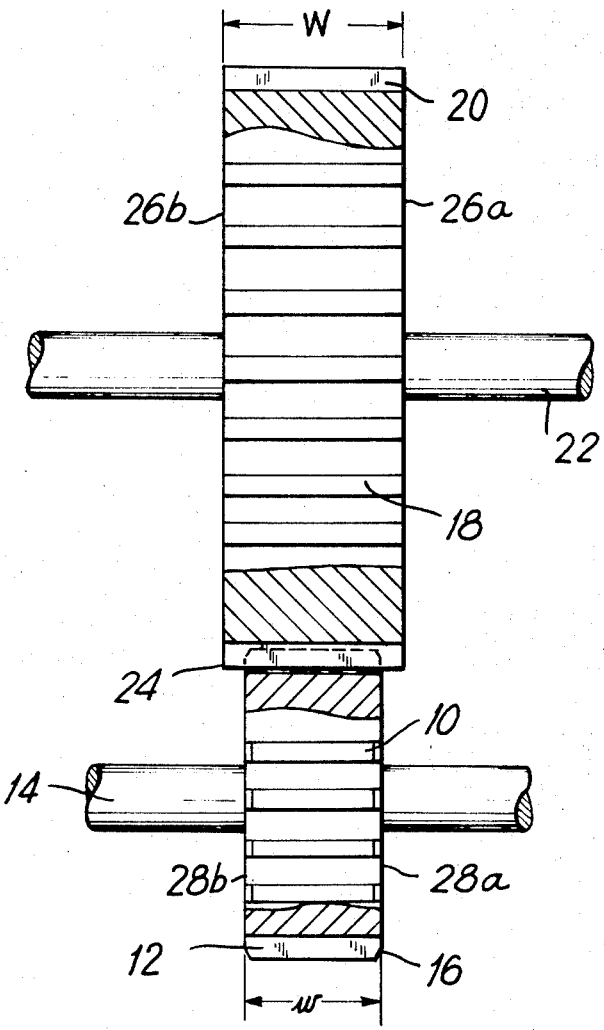
FIGS. 1 and 2 respectively illustrate spur and helical gear embodiments of the invention in a partly schematic and partly sectional manner.

Referring to the drawing, there is illustrated in FIG. 1 a pinion 10 made of steel and having case-hardened teeth, this pinion 10 being shown in mesh with gear component 18 which may be a simple spur gear, as illustrated, a helical gear, or any other component such as an internal or external ring gear or a rack. The teeth of the larger component 18 are surface-hardened as by induction or flame-hardening, and the width $w$ of the pinion 10, in a direction parallel to its axis 14 is substantially less than the width of the teeth of the component 18 in a direction parallel to the shaft or axis 22 thereof.

Figure 2:
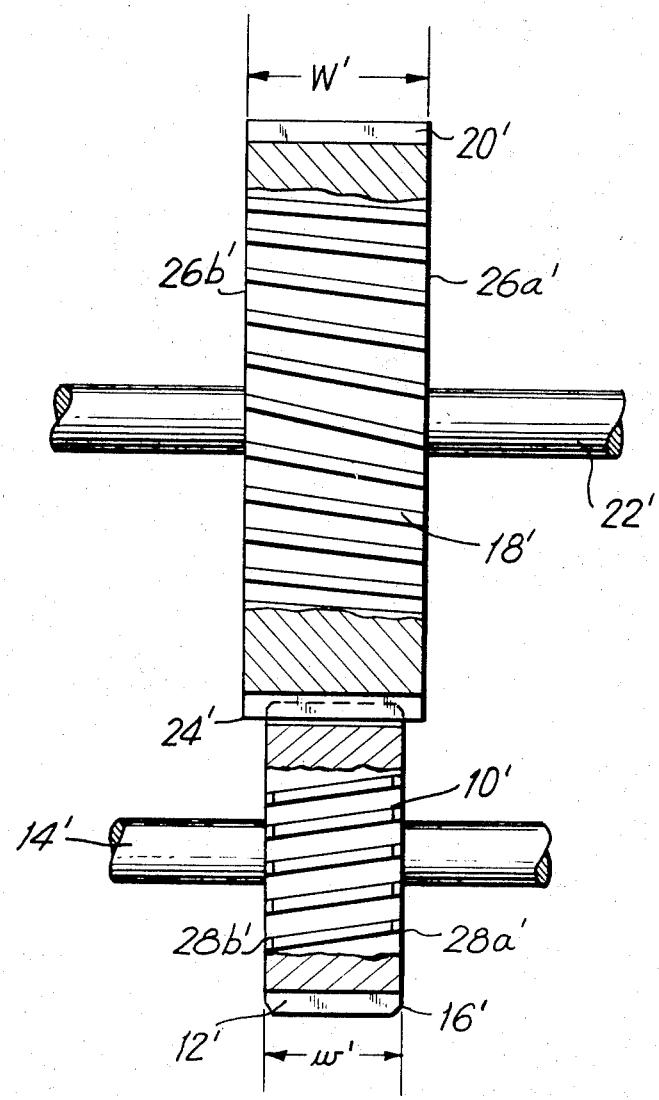

Thus, the steel pinion 10 which is case-hardened has opposed side surfaces 28a and 28b with the teeth 12 of the pinion extending parallel to the axis thereof, a suitable shaft 14 extending along this axis and carrying the driving or driven pinion 10. The shaft 14 may be integrally formed with the pinion 10. Also the pinion as well as gear component with which it meshes may have helical teeth or other types of gear teeth. Thus, FIG. 2 shows an embodiment of the invention where the pinion and gear component have helical teeth. Otherwise the embodiment of FIG. 2 is the same as that of FIG. 1. All of the parts of FIG. 2 which correspond to those of FIG. 1 are designated by the same reference characters primed. Thus, the entire description which is directed to FIG. 1 is equally applicable to FIG. 2 which differs only in that the elements have helical teeth. It will be noted that the ends 16 of the teeth 12 are rounded, but such rounding is not necessary. This pinion meshes with the larger component 18, which in the illustrated example is a spur gear, carried by or integral with a shaft 22 which extends along its axis. The teeth 20 of the gear 18 are surface hardened as by induction or flame-hardening, and it will be noted that the ends 24 of the teeth 20 are not rounded. The larger component 18 has opposed side surfaces 26a and 26b which respectively project through equal distances beyond the opposed side surfaces 28a and 28b, so that the pinion is centered with respect to the driven gear 18. The length $w$ of the teeth 16 is substantially less than the length $W$ of the teeth 20, this difference being on the order of 3–10 mm or more.

Thus, with the above construction since the width of the pinion 10 is substantially less than the width of the gear 18, the critical side regions of the wheel faces 26a and 26b do not mate with the pinion teeth. Moreover, the teeth 12 and 20 have addendum and thickness modifications sufficient to equalize their respective strength, so that these strengths are rendered approximately equal to each other, and the different dimensions $w$ and $W$ contribute to this advantage inasmuch as the outer side regions of the driven component 18 do not mesh with the pinion, thus contributing to the increased strength of the component 18. This is of particular relevance because of the greater strength of the case-hardened pinion.

Thus, with the pinion a reduction in weight, dimensions and costs is achieved while the center distance, namely, the distance between the axes 14 and 22 remain the same. Furthermore, reliability of the structure is increased and it is also possible to apply a greater work load. Finally, it should be noted that the side face regions of the gear wheel 18, which are critical in coupling of the latter with components of the same width, a distinct disadvantage in arrangements where the width of the pinion is greater than that of the wheel, contributes in this case to the strength of the component 18. Thus, damage to the gears and bearings normally caused by particles of metal circulating in the lubricant is avoided.

It is apparent, therefore, that with the above-described structure of the invention all of the advantages set forth above have been fully and effectively achieved. It will be realized, however, that the invention has been illustrated and described only by way of example so as to illustrate the principles of the invention which can of course be modified extensively without departing from principles of the invention.

What is claimed is:

1. In a gear transmission, a rotary pinion and a gear component meshing with said pinion, said gear component being of a size substantially larger than said rotary pinion, and said pinion and component respectively having parallel axes about which they rotate, said pinion and gear component also respectively having teeth, and the width of the teeth of said pinion, parallel to the axis thereof, being substantially less than the width of the teeth of said gear component parallel to the axis of the latter, said pinion being centrally arranged with respect to said component, with the latter having opposed side surfaces situated at substantially equal distances beyond opposed side surfaces of said pinion, and said pinion and component both being hardened and capable of withstanding substantially equal loads, said pinion being case-hardened, and said larger component being surface-hardened at its teeth, and the teeth of said pinion and component having addendums and thicknesses which equalize the load capacities.

2. The combination of claim 1 and wherein the teeth of said pinion have rounded ends.

3. The combination of claim 2 and wherein the teeth of said gear component have non-rounded ends.

4. The combination of claim 1 and wherein said component is in the form of a spur gear.

5. The combination of claim 1 and wherein said component is in the form of a helical gear.

6. The combination of claim 1 and wherein said pinion is made of steel.

7. The combination of claim 1 and wherein the difference between the width of the teeth of said pinion parallel to said axis thereof, and the width of the teeth of said component, parallel to the axis of the latter is on the order of 3–10 mm.

* * * * *